United States Patent [19]

Benson

[11] 4,296,846
[45] Oct. 27, 1981

[54] BRAKE RELEASE MECHANISM
[75] Inventor: Samuel L. Benson, Clinton Vermillion, Ind.
[73] Assignee: J. I. Case Company, Racine, Wis.
[21] Appl. No.: 122,545
[22] Filed: Feb. 19, 1980
[51] Int. Cl.³ .............................................. B60K 41/26
[52] U.S. Cl. .................................. 192/4 A; 194/4 C; 74/377
[58] Field of Search ...................... 192/4 A, 4 C, 4 R; 74/477, 483 R, 878, 481

[56] References Cited
U.S. PATENT DOCUMENTS 2,656,025  10/1953  Martin ................................. 192/4 A
3,710,904  1/1973   Boyer et al. ......................... 192/4 A
4,158,968  6/1979   Wilson et al. ....................... 192/4 A Primary Examiner—George H. Krizmanich
Attorney, Agent, or Firm—Cullen, Sloman, Cantor, Grauer, Scott & Rutherford

[57] ABSTRACT

A brake release mechanism, particularly for machines having a hydrostatic transmission, such as a tractor. The brake latching member includes a rotational latch pin receivable within a ratchet slot or the like in the brake lever to releasably hold the lever in the brake position. The latching member is connected to the transmission control arm by two cables. Each cable is connected at one end to a lever on the transmission control lever and the opposed cable ends are connected by lost motion links to the latching member, on opposed sides of the latch pin, such that rotation of the transmission control lever either direction from neutral will rotate the latch pin out of ratchet engagement with the brake lever and automatically release the brake upon actuation of the hydrostatic transmission into forward or reverse.

6 Claims, 4 Drawing Figures

BRAKE RELEASE MECHANISM

BACKGROUND OF THE INVENTION

Commercial tractors and similar machines generally include hydrostatic transmissions for controlling the speed, direction and pulling power of the tractor. The transmission is provided with a rotatable control lever or shaft which may be rotated in one direction for forward motion of the tractor and in the opposite direction for rearward or reverse motion. The speed of the tractor is proportional to the rotation of the control lever while the tractor engine is operated at a speed set by a conventional throttle device.

Commercial tractors of this type generally do not include a parking brake or brake pedal. The tractor is held on an incline by slightly advancing the hydrostatic transmission control lever in forward or reverse. When the transmission control is set at neutral, the tractor may roll down an incline. If the tractor is provided with a parking brake, the brake may be accidentally left engaged when the hydrostatic transmission is actuated into forward or reverse, wearing or possibly damaging the brake.

This problem is solved in the brake release mechanism of this invention, by functionally connecting the braking mechanism to the transmission control lever, such that the brake is automatically released when the hydrostatic transmission is actuated from neutral into forward or reverse. The brake release mechanism of this invention is relatively simple and mechanically actuated to reduce the chances of failure.

SUMMARY OF THE INVENTION

As described above, the brake release mechanism of this invention is particularly adapted to machines having a hydrostatic transmission, such as a tractor, and permits the use of a parking brake or similar foot pedal actuated brake. The transmission control may include a control rod or lever rotatable in opposite directions from a neutral position to control the input to the hydrostatic transmission. The brake control in the disclosed embodiment includes a brake control arm or lever rotatable about a pivot axis and a brake cable connected to the brake control arm, spaced from the pivot axis. Thus, rotation of the brake control arm tensions the brake cable to actuate the brake as conventionally understood. The brake assembly includes a latch mechanism, which releasably retains the brake control arm with the brake cable tensioned, to hold the brake in the brake position.

The improved brake release mechanism of this invention includes a lever on the transmission control arm and a cable connector interconnecting the transmission control arm lever and the latch means. The latch means preferably includes a rotatable latching element or pin which is rotatable into and out of latching engagement with the brake control arm. The cable connector is adapted to rotate the latching element out of latching engagement with the brake control arm upon rotation of the transmission control arm from neutral into either forward or reverse, thus automatically releasing the brake.

In the preferred embodiment of the brake release mechanism of this invention, the cable connector includes two flexible cables. Each cable is connected at one end to the transmission control arm lever and the cables are connected at their opposed ends to the latching member. In the preferred embodiment, the latching member is generally T-shaped having opposed arms of a transverse latch pin. The cables are connected to one of the opposed arms and the latching member by lost motion links. Each link has a slot receiving a pin attached to a latching member arm. In the neutral position of the transmission control arm, the pins engage opposite ends of the slots, such that rotation of the transmission control arm in either direction from neutral will rotate the latch pin out of latching engagement with the control arm and release the brake. In the disclosed embodiment, the brake lever or arm includes a ratchet slot and the latch pin is rotatable to be received within the ratchet slot and releasably retain the brake lever or arm in the braking position.

The brake release mechanism of the present invention thus permits the use of a foot actuated parking-type brake on a machine having a hydrostatic transmission, such as a tractor. The release mechanism automatically releases the parking brake upon actuation of the hydrostatic transmission from neutral into either forward or reverse. Other advantages and meritorious features of the present invention will be more fully understood from the following description of the preferred embodiments, the appended claims and the drawings, a brief description of which follows.

DESCRIPTION OF THE PREFERRED EMBODIMENT

Figure 1:
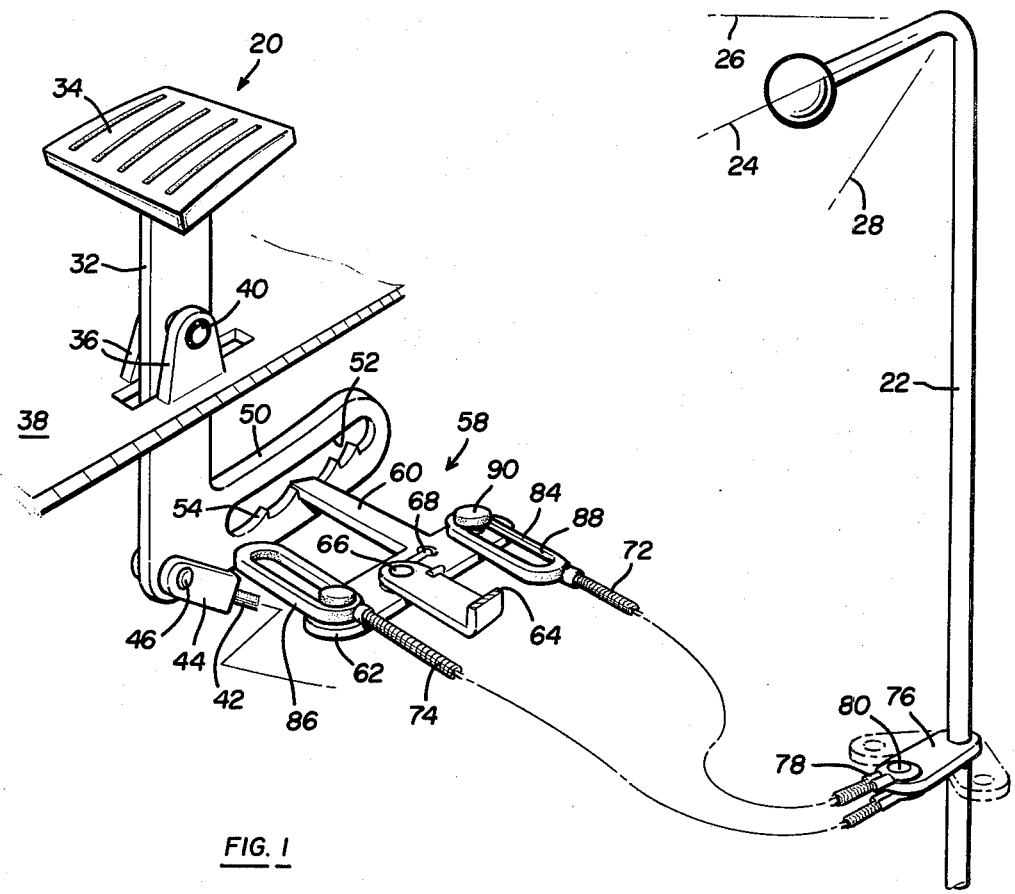
FIG. 1 is a side elevation, partially schematic, of the brake release mechanism of the present invention.
Figures 2, 3, 4:
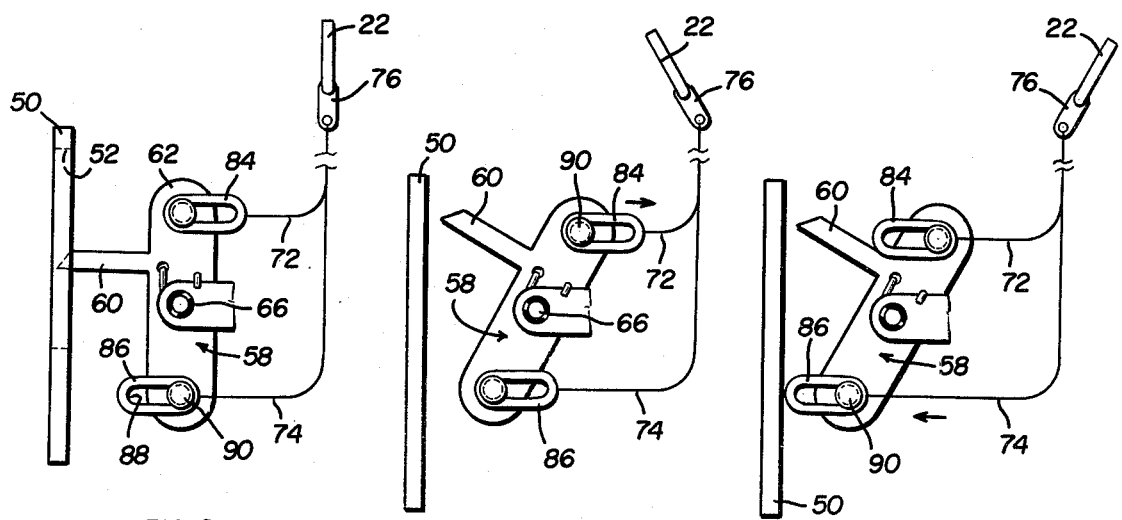
FIGS. 2 to 4 illustrate, somewhat schematically, the operation of the brake release mechanism of this invention.

As previously described, the brake release mechanism of this invention permits the use of a foot actuated brake mechanism, such as shown at 20 in FIG. 1, in a tractor or the like, having a hydrostatic transmission. In the disclosed embodiment, the hydrostatic transmission (not shown) is actuated by a control arm or lever 22. The lever may be rotated clockwise or counterclockwise to actuate the transmission in forward or reverse, respectively. As shown in FIGS. 1 and 2, the handle 24 is in the neutral position. If the handle is rotated in a clockwise direction, as shown in FIG. 4 and in phantom at 26 in FIG. 1, the transmission will move the tractor forwardly. If the control lever is rotated counterclockwise, as shown in FIG. 3 and in phantom at 28 in FIG. 1, the transmission will move the tractor rearwardly.

In the disclosed embodiment, the brake actuation mechanism 20 includes an L-shaped brake lever or arm 32 which supports a foot pedal 34. Brackets 36 are welded or otherwise secured to the support plate 38 and the transverse pivot pin 40 pivotally supports the brake lever. The brake cable 42 is pivotally supported at the lower end of the brake lever by clevis 44 and pivot pin 46. Thus, if the brake pedal 34 is depressed, the brake lever or arm 32 will be rotated in a clockwise direction, tensioning brake cable 42. As will be understood by those skilled in the art, tensioning of the brake cable will actuate a conventional parking-type brake.

In the disclosed embodiment, the lower leg portion 50 of the brake lever includes a ratchet slot 52 having conventional spaced ratchet teeth 54. The brake lever may thus be locked in the brake position by the latch 58, as now described.

The latch 58 is generally T-shaped including a latch pin 60 and opposed arms 62. The latch is supported by an L-shaped brakcet 64 and pivot pin or grommet 66. The spring member 68 normally biases the latch pin 60 into the ratchet slot 52 to retain the latch pin 60 against the shoulder portions of ratchet teeth 54. Thus, if the foot pedal 34 is depressed with the latch pin 60 located as shown in FIG. 1, the latch pin will retain the brake lever in the brake position, preventing rotation of the brake lever in a counterclockwise direction. As described, however, the brake lever is automatically released when the transmission control arm 22 is rotated in either direction, as now described.

As shown in FIG. 1, the transmission control arm 22 includes a control lever 76 which extends laterally from the control arm and is fixed thereto to rotate with the control arm. Flexible cables 72 and 74 are pivotally connected to the control arm lever 76 by clips 78 and grommet 80. Flexible cables 72 and 74 are connected at their opposed ends to one of the arms 62 of latch 58 by lost motion links 84 and 86, respectively. The lost motion links each include a slot 88 which receives pin 90. The pins are attached to an arm 62 and include a head portion which slidably retains the lost motion links.

As shown in FIGS. 2 to 4, the brake release mechanism of this invention automatically rotates the latch pin 60 out of ratchet engagement with the brake lever upon rotation of the transmission control arm in either direction. FIG. 2 illustrates the brake release mechanism with the control arm 22 in the "neutral position". As will be understood by those skilled in the art, a hydrostatic transmission utilizes a hydrostatic motor and pump and the transmission is controlled by varying the displacement of either the motor or the pump, or both, to achieve forward and reverse of the machine and to control the speed. Rotation of the control lever 22 from the neutral position shown in FIGS. 1 and 2, moves the swash plate of the pump or motor of the hydrostatic transmission from a neutral or non-displacement position to a displacement position. In the neutral position of the control lever 22, the pins 90 engage opposite ends of the lost motion link slots 88 as shown in FIGS. 1 and 2. The flexible cables 72 and 74, which interconnect the control lever 22 and the latch 58, are preferably of generally equal length. When the brake pedal 34 is depressed, the leg portion 50 of brake lever 32 is rotated in a clockwise direction. As shown, the ratchet slot 52 is circumferentially defined about the pivot 40 of the brake arm 32. Rotation of the foot portion 50 will cause the ratchet pin 60 to ride over the inclined portions of the ratchet teeth and then lock the brake arm at the furthest point of rotation with the arm, retaining the cable 42 in the brake position. As described above, rotation of the arm 32, tensions the brake cable 42, actuating the tractor brake, not shown. Thus, FIG. 2 illustrates the mechanism with the brake actuated and locked.

FIG. 3 illustrates the operation of the brake release mechanism upon counterclockwise rotation of the transmission control arm 22, which, in the disclosed embodiment, moves the tractor or the like rearwardly. As shown, counterclockwise rotation of the control arm rotates lever 76 to tension both control cables 72 and 74. Because the pin 90 in lost motion link 84 is located at the distal end of the slot, tensioning of cable 72 rotates latch 58 in a clockwise direction, rotating latch pin 90 out of ratchet slot 72, releasing the brake lever 52, cable 42 and the brake, not shown. The pin 90 in link 86 is initially located adjacent the cable, as shown in FIG. 2. Thus, tensioning cable 74 moves the pin to the distal end of the slot, as shown in FIG. 3.

Rotation of the transmission control arm 22 in a clockwise direction, to move the tractor forwardly, is illustrated in FIG. 4. As shown, clockwise rotation of the control arm 22 rotates lever 76 to compress cables 72 and 74. Because pin 90 is located in lost motion link 86 against the end of the slot, adjacent the cable, compression of cable 74 rotates latch 58 in a clockwise direction, as described above, to rotate latch pin 90 out of ratchet slot 52, releasing brake lever 52 and the brake. The pin 90 in lost link 84 is initially located at the distal end of the slot as shown in FIG. 2. Thus, compression of cable 72 moves the pin to the end of the slot, adjacent the cable, as shown in FIG. 4.

Thus, as described above, the brake release mechanism of this invention will automatically release the brake upon rotation of the transmission control arm or lever in either direction from the neutral position. It will be understood that various modifications may be made to the brake release mechanism disclosed in FIGS. 1 to 4 without departing from the perview of the invention as defined in the appended claims. For example, a hand operated brake lever may be substituted for the pedal actuated brake disclosed. Similarly, a pedal actuated transmission control may be substituted for the control arm disclosed. Having described the preferred embodiment of the invention, the following define the claims of invention:

I claim:

1. A brake release mechanism for a machine having a brake and a hydrostatic transmission, a transmission control means rotatable about one axis to control the input to said hydrostatic transmission, a brake control means including a brake control arm rotatable about a pivot axis and a brake cable connected to said control arm spaced from said pivot axis, the rotation of said brake control arm tensioning said brake cable to actuate said brake, and a latch means adapted to releasably retain said control arm rotational position with said brake cable tensioned to lock said brake, the improved brake release mechanism, comprising a lever connected to said transmission control means and rotatable therewith, said latch means having a rotatable latching element, said latching element rotatable into and out of latching engagement with said brake control arm, and a cable connector means interconnecting said lever and said latch means, said cable means adapted to rotate said latching element out of latching engagement with said brake control arm upon rotation of said transmission control means in either direction from a neutral position.

2. The brake release mechanism defined in claim 1, characterized in that said latching element is generally T-shaped, having opposed arms and a transverse latch pin, said brake control arm having a ratchet slot, said latch pin rotatable into and out of ratchet engagement with said brake control arm in said slot.

3. The brake release mechanism defined in claim 2, characterized in that said cable means comprises two cables, each cable connected at one end to said transmission control means lever and each cable connected at its opposed end to one of the opposed arms of said latching element.

4. The brake release mechanism defined in claim 3, characterized in that said cables are each connected to said latch means arms by lost motion links, each link having a slot receiving a pin attached to said latching element arm, said pins engaging opposite ends of said slots when said transmission control means is in said neutral position, such that rotation of said transmission control means in either direction will rotate said latching element latch pin out of latching engagement with said brake control arm ratchet slot and release said brake.

5. A brake release mechanism for a machine having a brake and a hydrostatic transmission, comprising: a pivotally supported brake actuating lever, a brake cable means connected to said brake lever, spaced from said pivotal support, said brake cable means actuating said brake upon rotation of said brake lever and tensioning of said brake cable, said brake lever having a ratchet slot, a rotatable latch member having a latch pin rotatable into and out of said ratchet slot releasably locking said brake lever with said brake cable tensioned, a transmission control lever means rotatable about an axis in opposite directions from a neutral position to actuate said hydrostatic transmission, and cable means connected at opposed ends to said transmission control lever means and said ratchet member, said cable means adapted to rotate said latch member out of ratchet engagement with said brake lever and release said brake upon rotation of said transmission control means in either direction from said neutral position.

6. A brake release mechanism for a machine having a hydrostatic transmission, a foot pedal actuated brake assembly including a pivotally supported brake lever, a brake mechanism and a brake cable interconnecting said brake lever and said brake mechanism, whereby said brake mechanism is actuated upon rotation of said brake lever and tensioning said brake cable, a brake latching mechanism, including a rotatably supported T-shaped latch member having a latch pin and laterally opposed arms, said brake lever having a ratchet slot circumferentially defined about said pivot support and said latch pin rotatable into and out of said ratchet slot to releasably lock said brake lever with said brake cable tensioned, a transmission control rod means rotatable about an axis in opposite directions from a neutral position adapted to actuate said hydrostatic transmission, said control rod means having a laterally extending lever, said lever rotatable with said control rod means and a pair of flexible cables, each cable connected at one end to said control rod lever, said cables connected at their opposed ends to one of said latch member arms by a lost motion link, each link having a slot receiving a pin attached to said latch member arms and said pins engaging opposite ends of said slots when said control rod means is in said neutral position, whereby rotation of said transmission control rod means in either direction from said neutral position will rotate said latch pin out of said brake lever ratchet slot, thereby releasing said brake.

* * * * *